(12) United States Patent
Fukasaku et al.

(10) Patent No.: US 7,246,428 B2
(45) Date of Patent: Jul. 24, 2007

(54) METHOD FOR MAKING A COIL PIECE ONTO A CORE OF ROTARY ELECTRIC MACHINE

(75) Inventors: Hiroshi Fukasaku, Kariya (JP); Kiyoshi Uetsuji, Kariya (JP); Taku Adaniya, Kariya (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 39 days.

(21) Appl. No.: 11/096,106

(22) Filed: Mar. 31, 2005

(65) Prior Publication Data

US 2005/0218746 A1 Oct. 6, 2005

(30) Foreign Application Priority Data

Mar. 31, 2004 (JP) .............................. 2004-107227

(51) Int. Cl.
H01F 7/06 (2006.01)
H02K 3/04 (2006.01)

(52) U.S. Cl. ............................ 29/605; 29/606; 29/854; 29/868; 29/869; 310/208; 310/184

(58) Field of Classification Search ................. 29/605, 29/606, 868, 869, 854; 310/208, 254, 184, 310/259, 179, 214; 242/166, 378, 160.2, 242/337.1, 273, 388

See application file for complete search history.

(56) References Cited

U.S. PATENT DOCUMENTS 4,197,477 A 4/1980 Reynolds .................... 310/264
5,010,639 A * 4/1991 Veser .......................... 29/734
5,260,620 A * 11/1993 Morrill ....................... 310/185
5,331,244 A * 7/1994 Rabe .......................... 310/180
6,657,331 B2 * 12/2003 Asao et al. ................... 310/54

FOREIGN PATENT DOCUMENTS

| JP | 55-23791 | 2/1980 |
| JP | 57-126246 | 8/1982 |
| JP | 59-136035 | 8/1984 |

(Continued)

Primary Examiner—A. Dexter Tugbang
Assistant Examiner—Tai Van Nguyen
(74) Attorney, Agent, or Firm—Morgan & Finnegan, L.L.P.

(57) ABSTRACT

A method for mounting a coil onto a stator for a rotary electric machine. The method includes forming a coil piece by winding wire having a flat cross section into a single row lamination state including wire layers that are aligned along a line that is perpendicular to flat surfaces of the wire. The coil piece is formed so that a first portion to be inserted in the slot and a second portion that is not inserted in the slot appear alternately along the coil piece. The method also includes displacing the wire layers at the first portion from one another to change the single row lamination state to a connectively laminated stat e in which the wire layers at the portion to be inserted in the slot each adjacent pair of the wire layers partially overlap with respect to a direction perpendicular to the flat surfaces of the wire. The method further includes inserting the wires of the first portion into the slot, by passing each of the wire layers through the opening of the slot successively from the wire layer at the top of the lamination and displacing each of the wire layers at the first portion from each other.

9 Claims, 8 Drawing Sheets

FOREIGN PATENT DOCUMENTS

| | | |
|---|---|---|
| JP | 61-138343 | 8/1986 |
| JP | 03-284148 | 12/1991 |
| JP | 07-184333 | 7/1995 |
| JP | 07-255158 | 10/1995 |
| JP | 08-023646 | 1/1996 |
| JP | 08-065973 | 3/1996 |
| JP | 10-066314 | 3/1998 |
| JP | 2003-204647 | 7/2003 |

* cited by examiner

METHOD FOR MAKING A COIL PIECE ONTO A CORE OF ROTARY ELECTRIC MACHINE

BACKGROUND OF THE INVENTION

The present invention relates to a rotary electric machine and a method for mounting a coil on a core for a rotary electric machine.

A typical rotary electric machine such as a motor and a generator is formed by disposing a coil onto a core that is used for a rotary electric machine, in which a stator (or a rotor) is formed of laminated steel sheets. For example, when a stator core is used, teeth are formed in the inner circumferential surface (or outer circumferential surface) of the stator core and a stator is formed by inserting a coil in slots formed between the teeth. The coil is formed from a conductive wire insulated with a coating. Conventionally, wires having a circular cross-section have been used. However, wires having a flat cross-section such as oval or rectangular have come into use as described in Japanese Laid-Open Patent Publication No. 10-66314 to improve the output characteristics of the rotary electric machine by increasing the density (lamination factor) of the coil in each slot. In this case, the number of coil side wires inserted in each slot may be increased in order to optimize the operating condition of the rotary electric machine.

Japanese Laid-Open Patent Publication No. 10-66314 discloses coil pieces formed before being mounted onto the stator. Each coil piece is formed by winding wire having rectangular cross section, such that coil sides, each of which is a section inserted in a slot opening, and coil ends, each of which is not inserted in the slot, are arranged to appear alternatively as the wire is wound in a spiral form. The coil is mounted on the stator core by inserting the coil side wires into the corresponding slot through an open end of the slot. Each coil piece is formed into a shape in which adjacent coil side wires (and adjacent coil end wires) abut each other on the narrower sides of the rectangular cross section of the wire and the wider sides of the wire side faces together form a substantially planar surface.

According to the method for mounting a coil described in Japanese Laid-Open Patent Publication No. 10-66314, the coil pieces connected by the connecting wire are formed in advance with a twisted portion. One coil side of each of two coil pieces are then inserted into one slot successively such that two coil pieces are disposed next to each other in the circumferential direction of the stator core. That is, the coil side wires of each coil piece inserted in the slot overlap along the radial direction of the stator core in the slot. Therefore, the coil side wires of the second coil piece are laminated consecutively onto the coil side wires of the first coil piece in the radial direction of the stator core.

The above described coil can permit the coil side wires to be inserted in the slots without being hindered, even if the open end of each slot is somewhat narrowed by a projection extending toward the circumferential direction of the stator from the distal end of each tooth as described in Japanese Laid-Open Patent Publication No. 2003-204647.

However, when the coil pieces of the Japanese Laid-Open Patent Publication No. 10-66314 are used in some slots where the open end of each slot in harrowed, the coil side wires of the coil piece that has earlier been inserted in the slot might block the opening of the slot from inside depending on the position and shape of the openings. This might obstruct insertion of the subsequent coil pieces into the slot.

Therefore, according to the method for mounting a coil described in Japanese Laid-Open Patent Publication No. 10-66314, the number of coils that are inserted in each slot cannot be increased in some positions where the opening of each slot is narrow. If so, as the lamination factor of the coils in each slot cannot be improved, the output characteristics of the rotary electric machine cannot be improved as desired.

Japanese Laid-Open Patent Publication No. 2003-204647 discloses a number of U-shaped coil pieces, each coil piece being inserted in the slot from the axial direction of the stator core such that both leg portions of each coil piece (coil sides) are laminated in the radial direction of the stator core while sandwiching one of the teeth from both sides. In this manner, the coil pieces are temporarily mounted in the slots. Subsequently, the distal ends of the leg portions (coil ends) of the coil pieces that project axially outward from the slots are connected by TIG welding or the like such that the laminated coil pieces are connected in a spiral form. As a result, a coil is formed.

According to the method for mounting the coil described in Japanese Laid-open Patent Publication No. 2003-204647, various types of U-shaped coil pieces with various sizes are prepared. Leg portions (coil sides) of the coil pieces are successively inserted in a single slot such that the leg portions are sequentially laminated in the circumferential direction of the stator core.

The method for mounting the coil described in Japanese Laid-Open Patent Publication No. 2003-204647 reduces the risk that the legs (coil sides) of the previously mounted coil pieces will obstruct other coil pieces that are subsequently mounted (inserted). However, the method requires a complicated operation for connecting the distal ends of the legs of the coil pieces through welding or the like after temporarily mounting the coil pieces to the slots. This reduces production efficiency.

SUMMARY OF THE INVENTION

Accordingly, it is an objective of the present invention to provide a rotary electric machine and a method for mounting a coil of a core for a rotary electric machine that reliably ensures the lamination factor for the coil in slots and improves the output characteristics of the rotary electric machine without decreasing production efficiency.

In order to achieve the above objective, the present invention provides a method for mounting a coil piece onto a core of a rotary electric machine. The core has a plurality of slots each having an opening. The method includes: repeatedly winding wire having a flat-cross-section so that the wire forms a plurality of wire layers that are laminated in a single row, thereby forming the coil piece in which the wire layers are in a first laminated state, the first laminated state referring to a state in which the plurality of wire layers are aligned along a line that is perpendicular to flat surfaces of the wire, wherein the coil piece has first portions each inserted into one of the slots and second portions that are not inserted into the slots, the first portions and the second portions are arranged alternately along a direction in which the wire extends; shifting the state of the first portions from the first laminated state to a second laminated state by displacing the wire layers in each first portion relative to each other along the flat surfaces of the wire, the second laminated state referring to a state in which each adjacent pair of the wire layers partially overlap with respect to a direction perpendicular to the flat surfaces of the wire; inserting the first portions in the second laminated state into the slots by causing each first portion to pass through the opening of the corresponding slot in an order from the head of the laminated wire layers; and returning the first portions in the slots from the second laminated state to the first laminated state by displacing the wire layers in each first portion relative to each other.

The present invention also provides a rotary electric machine including a core having a plurality of slots, and a coil piece mounted onto the core. The coil piece is formed by repeatedly winding wire having a flat-cross-section so that the wire forms a plurality of wire layers that are laminated in a single row. The coil piece has first portions each inserted into one of the slots and second portions that are not inserted into the slots. The first portions and the second portions are arranged alternately along a direction in which the wire extends. The wire layers in each first portion are laminated while being aligned along a direction intersecting the depth of the corresponding slot.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A method for mounting a coil to a stator core of a motor 10 according to one embodiment of the present invention will how be described with reference to FIGS. 1 to 8. The motor 10 is one type of a rotary electric machine.

Figure 1:
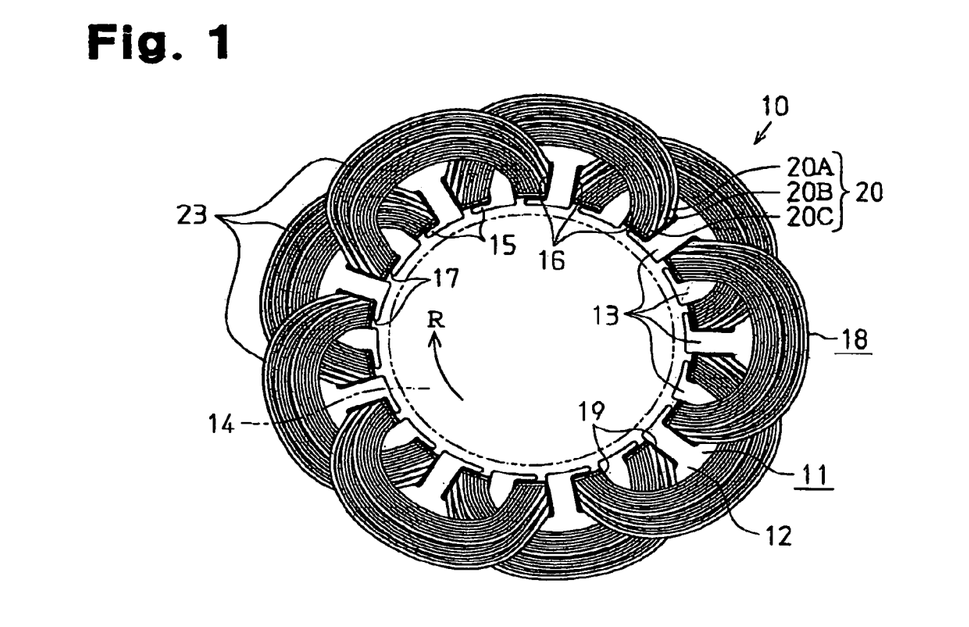
FIG. 1 is a back view illustrating a stator core of a motor according to a preferred embodiment.

FIG. 1 shows a part of a rotary electric machine, which is the motor 10 in this embodiment. As shown in FIG. 1, a core for a rotary electric machine, a stator core 11 in this embodiment, has a cylindrical core body 12 formed of laminated steel sheets. Teeth 13 project radially inward from the inner circumferential surface of the core body 12 with an equal pitch in the circumferential direction of the stator. Each tooth 13 has a projection 15 at its distal end. Each projection 15 extends along a direction opposite to the rotation direction R of a rotor core 14 shown by a chain double-dashed line in FIG. 1 so that the teeth 13 are L-shaped. A slot 16 is formed between the adjacent teeth 13 extending along the axial direction of the core body 12. In the preferred embodiment, the stator core 11 is a straight core in which the slots 16 extend along to the axial direction.

Each slot 16 has an opening 17, which is defined by the distal ends of the teeth 13 located adjacent to each other to sandwich the slot 16 from the circumferential direction. The opening 17 of each slot 16 is narrower than the circumferential width of the slot 16 by the length of the projection 15, which extends from the distal end of the corresponding tooth 13 along the direction opposite to the rotation direction R of the rotor core 14. A rectangular wire 18 having a flat cross-section formed of an insulated conducting wire is inserted in the slots 16 via the openings 17. The width of the wider surface of the wire 18 is greater than the width (circumferential width) of each opening 17 and the narrower end face of the rectangular wire 18 is smaller than the width of the opening 17.

The rectangular wire 18 is mounted in the slots 16 via insulating papers 19 through distributed winding. The stator core 11 therefore functions as a stator for the motor 10. As shown in FIG. 1, in the preferred embodiment, the rectangular wire 18 is mounted in the slots 16 such that the rectangular wire 18 is brought into a single row laminated state in the circumferential direction of the stator core 11. Further, three rows (several rows) of the single row laminated state, a first laminated state, of the rectangular wire 18 that are in phase are formed in the same slot 16 along the depth direction of the slot 16.

A procedure for mounting the rectangular wire 18 on the stator core 11 and various devices used in the mounting operation will now be described.

Figure 2:
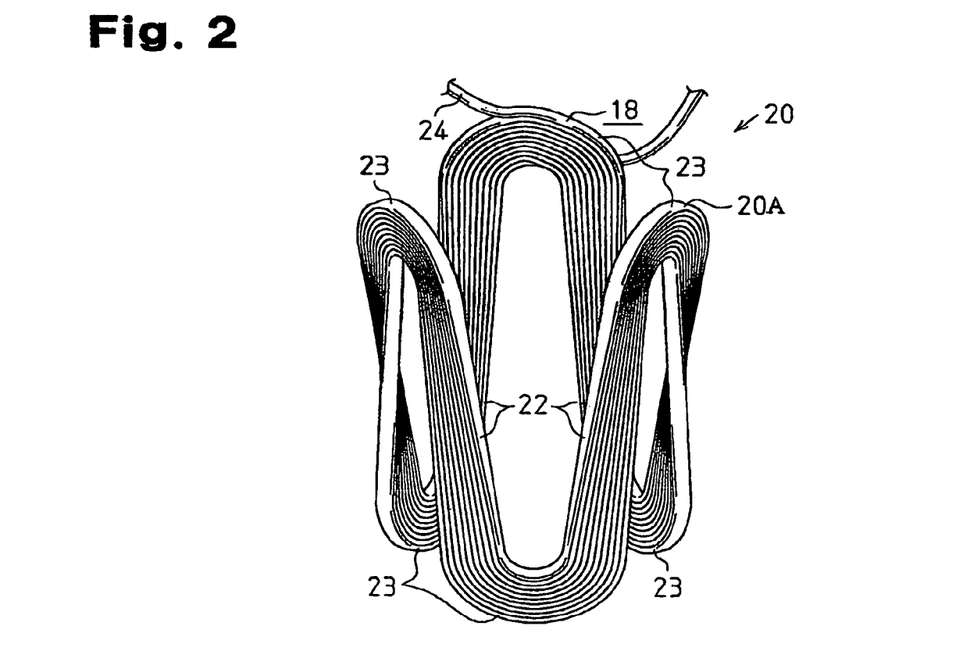
FIG. 2 is a perspective view illustrating a coil piece.
Figure 3:
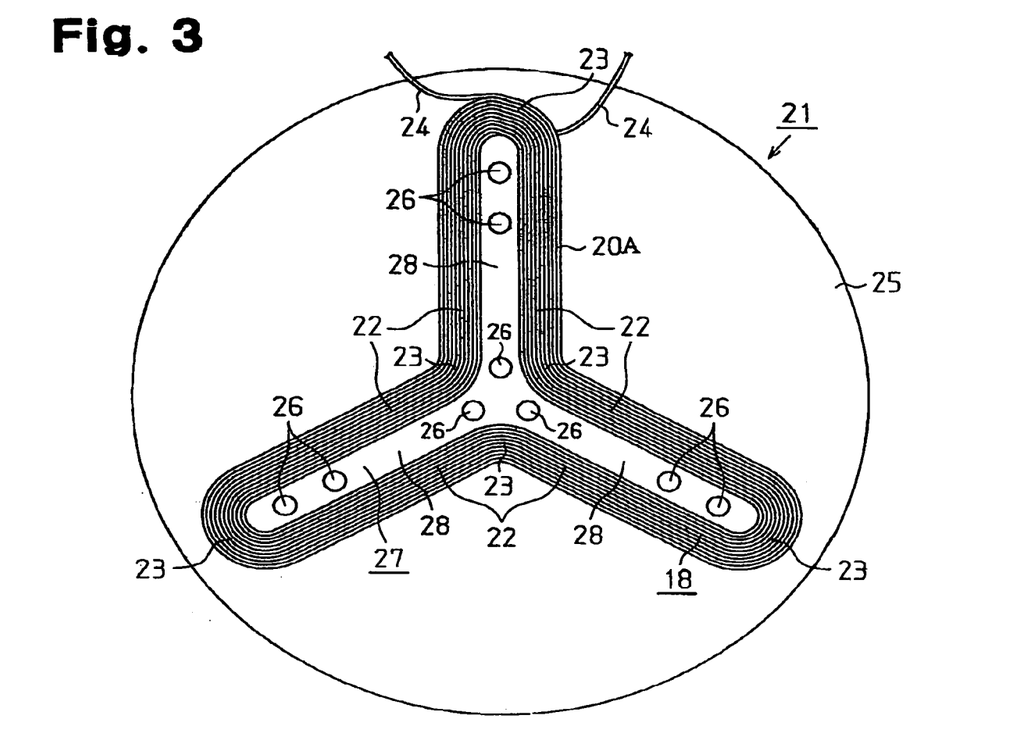
FIG. 3 is a plan view illustrating a state where rectangular wire is wound about a coil piece forming the device.

When mounting the rectangular wire 18 on the stator core 11, the rectangular wire 18, which is wound about a bobbin or the like (not shown), is wound several times in a single row in advance using a coil piece forming device 21 as shown in FIG. 3. Accordingly, a coil piece (or a coil preform) 20 as shown in FIG. 2 is formed. The coil piece 20 has coil sides (slot inserted sections) 22 and coil ends (slot non-inserted sections) 23, which are alternately and continuously arranged in a single row laminated state. The coil sides 22 are straight and will be inserted in the slots 16 when the rectangular wire 18 is mounted on the stator core 11. The coil ends 23 are curved and will not be inserted in the slots 16. More specifically, the coil piece 20 is formed into the single row laminated state in which the wide surfaces of the rectangular wire 18 serve as laminated surfaces. In the winding direction of the rectangular wire 18, three or more (six in this embodiment) laminated bundles of the coil sides 22, which are in the single row laminated state, are provided. Laminated bundles of the coil ends 23, which are also in the single row laminated state, are each located between the bundles of coil sides 22.

In the preferred embodiment, three coil pieces 20 (only one of which is shown in FIG. 2) are formed and are connected to one another with a connecting wire 24. The coil piece 20 shown in FIGS. 2 and 3 is a first row (first) coil piece 20A, which is mounted in the innermost sections of the slots 16. The rectangular wire 18 is wound ten times into the single row laminated state. A second row (second) coil piece 20B (see FIG. 1), which is mounted at the second innermost row in the slots 16, is formed by winding the rectangular wire 18 nine times into the single row laminated state. A third row (third) coil piece 20C (see FIG. 1.), which is mounted at the third row from the innermost sections of the slots 16 (or at the section closest to the opening 17), is formed by winding the rectangular wire 18 eight times into the single row laminated state.

As shown in FIG. 3, the coil piece forming device 21 has a circular substrate 25 and a three-forked block 27, which is secured Lo the substrate 25 with screws 26. The three-forked block 27 is secured to the substrate 25 such that the branch point of the three-forked block 27 is aligned with the center of the substrate 25. Three plate-like arms 28 extend straight and radially outward from the branch point at angular intervals of 120 degrees. The plate-like arms 28 are formed such that the height (thickness) of each plate-like arm 28 from the surface of the substrate 25 is greater than or equal to the width of the wide surface of the rectangular wire 18.

As shown in FIG. 3, sections of the coil piece 20 that correspond to the coil sides 22 are laminated in a single row along the straight side surfaces of the plate-like arms 28 by winding the rectangular wire 18 about the plate-like arms 28. In addition, sections corresponding to the coil ends 23 of the coil piece 20 arc laminated in a single row along arcuate distal end faces and concave proximal branch surfaces of the plate-like arms 28 by winding the rectangular wire 18 about the plate-like arms 28. That is, the coil piece 20 includes three pairs of bundles of the coil sides 22 (six bundles of the coil sides 22) in the single row laminated state and six bundles of the coil ends 23 in the single row laminated state. Each pair of bundles of the coil sides 22 includes left and right bundles of the coil sides 22, which are parallel to each other. The coil ends 23 connect the three pairs of bundles of the coil sides 22 (six bundles of the coil sides 22) with a certain curvature.

The coil piece 20 that has been wound as shown in FIG. 3 is still flat where the coil sides 22 and the coil ends 23 abut against the substrate 25 of the coil piece forming device 21. Therefore, after the coil piece 20 has been wound to the coil piece forming device 21, the coil piece 20 that is flat is removed upward from the three-forked block 27. The three pairs of bundles of the coil sides 22 (six bundles of the coil sides 22) are then lifted such that the bundles of the coil sides 22 that form a pair are maintained to be substantially parallel to each other. That is, the three pairs of the coil sides 22 are lifted while the curved sections of the three of the six bundles of the coil ends 23 formed along the proximal branch surfaces of the plate-like arms 28 are held as base portions for lifting. As a result, the coil piece 20 that is brought into a lifted state as shown in FIG. 2 is formed. After that, the coil piece 20 is inserted in the slots 16 of the stator core 11 using a coil side holding device (first connectively laminated state holding device) 30 shown in FIG. 4.

Figure 4:
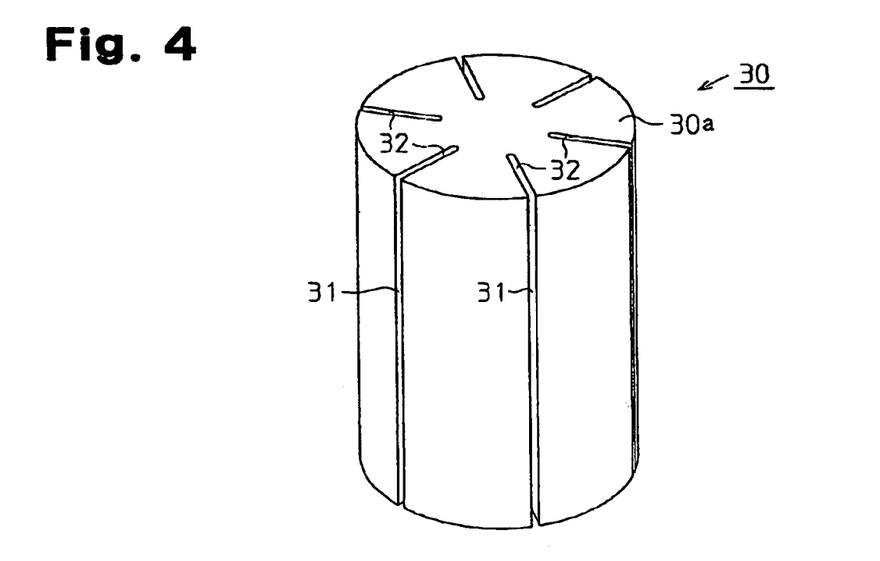
FIG. 4 is a perspective view illustrating a coil side holding device (a first connectively laminated state holding device)

The coil side holding device 30 includes a columnar main body 30a, which is selectively fitted in the core body 12 of the stator core 11. Groove-like guide passages 32, the number of which is the same as the number of the bundles of the coil sides 22 of the coil piece 20, that is, six in this embodiment, are formed in the outer circumferential surface of the main body 30a (the section corresponding to the inner circumferential surface of the core body 12) along the radial direction of the main body 30a. Each guide passage 32 has a passage opening 31 the size of which corresponds to that of the opening 17 of each slot 16. The stator core 11 is a straight core in which the slots 16 are formed along the axial direction of the stator core 11. Therefore, the entire length of the guide passages 32 and the passage openings 31 defined in the outer circumferential surface of the main body 30a extend along the axial direction of the columnar main body 30a so that the guide passages 32 correspond to the shape of the slots 16 (and its openings 17).

Figure 5:
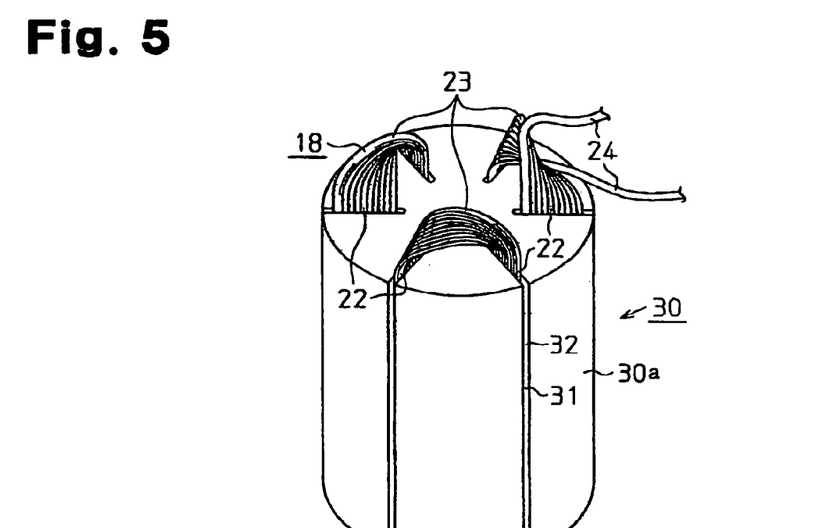
FIG. 5 is a perspective view illustrating a state where the coil piece shown in FIG. 2 is temporarily accommodated in the coil side holding device shown in FIG. 4.
Figure 6:
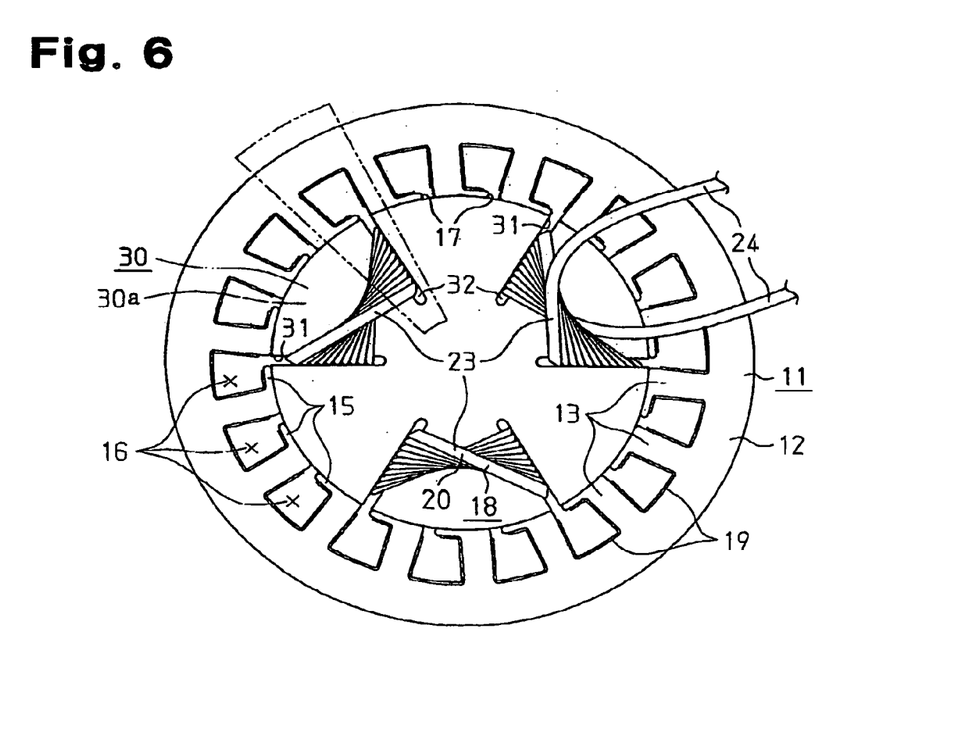
FIG. 6 is a front view illustrating a state where the coil side holding device in the state shown in FIG. 5 is fitted to the stator core.

When inserting the coil sides 22 of the coil piece 20 to the slots 16, the coil sides 22 are temporarily accommodated in the guide passages 32 of the coil side holding device 30 (the main body 30a) as shown in FIG. 5 in the preceding step. Next, the coil side holding device 30 (main body 30a) is fitted in the stator core 11 (the core body 12) as shown in FIG. 6. The passage openings 31 of the guide passages 32 are then aligned with the openings 17 of the slots 16 into which the coil sides 22 that are temporarily accommodated in the guide passages 32 will be inserted.

FIGS. 7(a) to 7(f) are views explaining changes in the laminated state and the movement manner of the coil sides 22 that are surrounded by a chain double-dashed line in FIG. 6 when the coil sides 22 are inserted (mounted) in the slots 16 using the coil side holding device 30 and the like. A procedure for inserting each bundle of the coil sides 22 in the corresponding slot 16 by bringing the coil sides 22 into a connectively laminated state, that is the second lamination state shown in FIGS. 7(b), and 7(c), from the single row laminated state (the state shown in FIG. 7(a)) and then returning the coil sides 22 to the original single row laminated state will now be described.

Figure 7A:
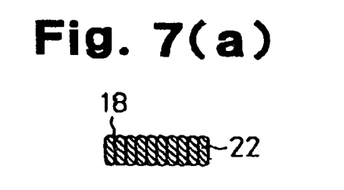
FIGS. 7(a) to 7(f) are partial cross-sectional views successively illustrating a procedure for inserting (mounting) the coil sides.

When the coil piece 20 is in the lifted state as shown in FIG. 2, each bundle of the coil sides 22 is in the single row laminated state in which the rectangular wires 18 (the number of which is ten in the case with the first row coil piece 20A shown in FIG. (7a)) are laminated in a single row with the wide surfaces serving as the laminated surfaces as shown by a cross-sectional view in FIG. 7(a). As described above, the width of the wide surface of each coil side 22, which is the laminated surface, is greater than the width of each opening 17. As is obvious from FIG. 7(a), the entire length of the bundle of the coil sides 22 in the lamination direction of the single row laminated state is even greater than the width of the wide surface. Since the coil sides 22 cannot pass through the opening 17 of the corresponding slot 16 in the single row laminated state, the coil sides 22 are changed to the following laminated state from the single row laminated state.

Figure 7B:
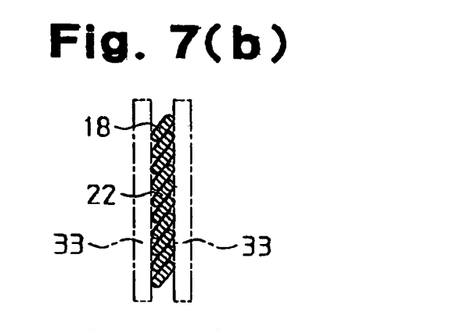

That is, as shown in FIG. 7(b), the coil sides 22 in the single row laminated state are displaced with respect to one another such that the coil sides 22 are in the connectively laminated state in which the coil sides 22 that are adjacent to each other in the lamination direction are substantially parallel to each other and partially contact each other as viewed in the cross-sectional view. At this time, the coil sides 22 in the connectively laminated state may be sandwiched from both the left and right sides, which is a direction that intersects with, or that is perpendicular to, the connecting direction of the coil sides 22, using a pair of left and right holding members (for example, a pair of long plates or the like) 33 as shown by a dashed line in FIG. 7(b). When the holding members 33 are used, each of the coil sides 22 in the connectively laminated state is quickly and reliably inclined with respect to the connecting direction so that the coil sides 22 can pass through the opening 17 of the corresponding slot 16. When holding the coil sides 22 with the holding members 33, both ends of the bundle of the coil sides 22 (the boundaries between the coil ends 23 and the coil sides 22)) are preferably held.

Each bundle of the coil sides 22 is thus brought into the connectively laminated state shown in FIG. 7(b) by the pairs of holding members 33 holding both ends of the bundle of the coil sides 22. The bundles of the coil sides 22 are then temporarily accommodated in the guide passages 32 of the coil side holding device 30 shown in FIG. 4 as described above. After that, each pair of holding members 33 releases the coil sides 22. The coil piece 20 (20A) is thus brought into a state where the three pairs of bundles of the coil sides 22 (six bundles of the coil sides 22) are accommodated in the guide passages 32 of the coil side holding device 30 (main body 30a) while maintaining the connectively laminated state. Each bundle of the coil pieces 22 is held from both left and right sides, which is a direction that intersects with, or is perpendicular to, the connecting direction, by the inner side surfaces 32a of the corresponding guide passage 32. That is, the coil piece 20 (20A) is brought into a state as shown in FIG. 5.

Figure 8:
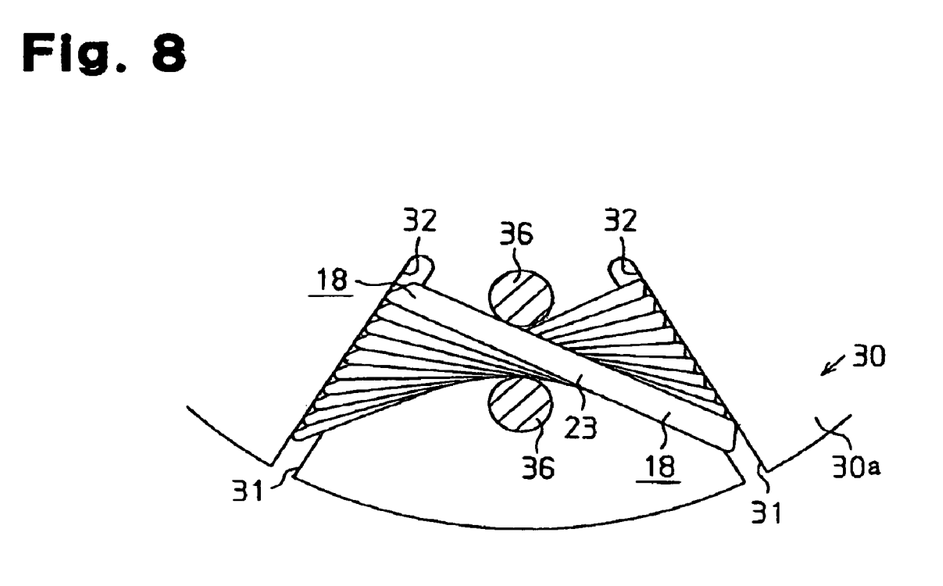
FIG. 8 is a partial plan view illustrating a connectively laminated state of the coil end.

In this case, as shown in FIGS. 5, 6, and 8, a section of each bundle of the coil ends 23 that is not accommodated in the corresponding guide passage 32 of the coil side holding device 30 (main body 30a) is twisted such that the outermost layer of the coil ends 23 intersects with the innermost layer of the coil ends 23 by the greatest degree. That is, when each bundle of the coil sides 22 is brought into the connectively laminated state from the single row laminated state, each bundle of the coil ends 23 that has been in the single row laminated state is also displaced and the laminated state is changed. More specifically, the adjacent coil ends 23 in the lamination direction are displaced from each other into the connectively laminated state in which the adjacent coil ends 23 partially contact each other while intersecting each other.

Figure 7C:
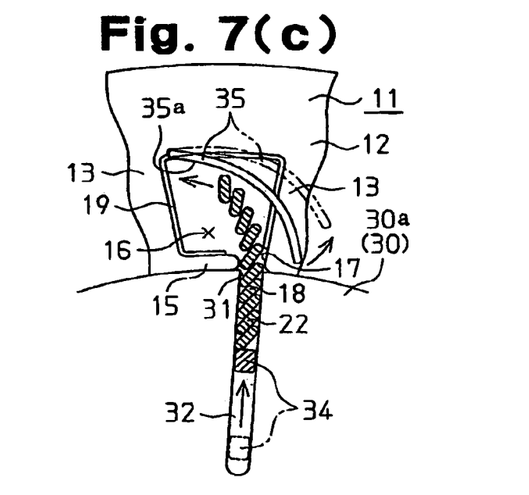

The coil side holding device 30 (main body 30a) that accommodates the bundles of the coil sides 22 in the guide passages 32 is then fitted in the stator core 11 (core body 12) as described above to be brought into the state shown in FIG. 6. As shown in FIG. 7(c), an extruding member (square bar or the like) 34 having substantially the same width as the guide passages 32 is inserted in the inner section of each guide passage 32 from the axial direction of the main body 30a. Each extruding member 34 is moved toward the passage opening 31 from the inner section of the corresponding guide passage 32 so that the coil sides 22 in the connectively laminated state in the guide passage 32 are extruded from the guide passage 32. The coil sides 22 are thus inserted in the corresponding slot 16 via the passage opening 31 and the opening 17 of the slot 16 successively from the coil side 22 located at the head of the coil sides 22 in the connecting direction (in this case, the coil side 22 closest to the passage opening 31).

In the preferred embodiment, the rectangular wire 18 is designed to be mounted on the stator core 11 such that the rectangular wire 18 is in the single row laminated state in each slot 16 in the circumferential direction of the stator core 11. Therefore, the coil sides 22 that are successively inserted in each slot 16 in the connectively laminated state must be returned to the original single row laminated state. Therefore, a guide device 35 as shown in FIG. 7(c) is used to return the laminated state of the coil sides 22 in the inner section of each slot 16 from the connectively laminated state to the original single row laminated state. The guide device 35 is formed of a curved rod material (or plate material and the like). The concave surface of the guide device 35 functions as a guide portion 35a.

As shown in FIG. 7(c), the guide device 35 is movable along the end face of the stator core 11 (core body 12). While one end of the guide device 35 (left end as viewed in FIG. 7(c)) is fixed as a fulcrum, the other end is pivoted and displaced such that the coil sides 22 inserted in the each slot 16 abut against the guide portion 35a. After abutting against the guide portion 35a that is pivoted and displaced, the coil sides 22 move along the guide portion 35a. That is, while one end of the guide device 35 that serves as the fulcrum is located at the inner corner of the slot 16, the other end of the guide device 35 is movable toward the inner section of the slot 16 from the vicinity of the opening 17 of the slot 16. Thus, the coil sides 22 that abut against the guide portion 35a are guided diagonally inward of the slot 16. Therefore, the coil sides 22 are displaced relative to one another from the connectively laminated state located along the radial direction of the stator core 11 to the single row laminated state located along the circumferential direction of the stator core 11. The displacement causes the coil sides 22 to be brought into the single row laminated state in which the lamination direction of the coil sides 22 intersects with the depth direction of the slot 16.

Figure 7D:
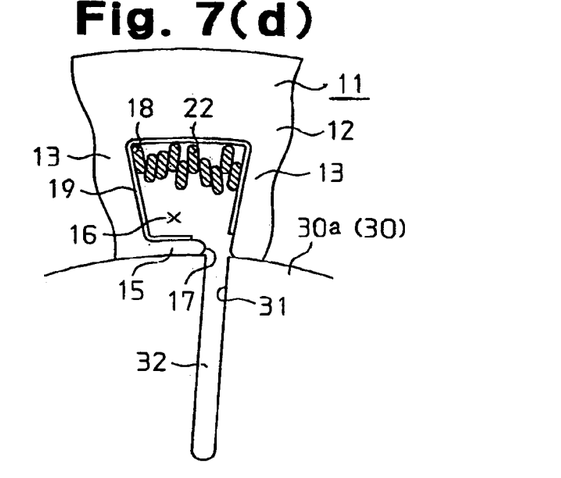

When each extruding member 34 extrudes the coil sides 22 from the guide passage 32 into the corresponding slot 16 and when the coil sides 22 move along the guide portion 35a of the corresponding guide device 35 after abutting against the guide portion 35a, the connecting state (laminated state) of the coil sides 22 might be separated. Therefore, in the preferred embodiment, as shown in FIG. 8, the intersecting portion of the twist of each bundle of the coil ends 23 is held by a pair of holding members (round bar or the like) 36 when the bundles of the coil sides 22 are inserted in the slots 16. Through the above described insertion procedure, the coil sides 22 are mounted on the stator core 11 in a state where the coil sides 22 are arranged close together at the innermost section of each slot 16 as shown in FIG. 7(d).

Figure 7E:
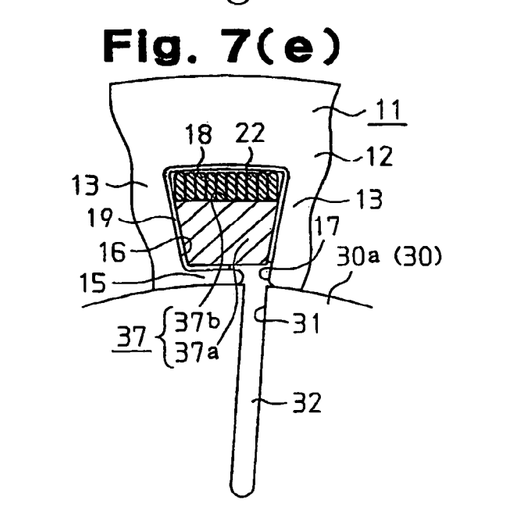

However, in this case, the coil sides 22 are not necessarily in the aligned single row laminated state, but might be in a single row laminated state in which the coil sides 22 are not aligned. Therefore, in the preferred embodiment, an alignment device 37 is used to align the coil sides 22 to be in the original single row laminated state as shown in FIG. 7(e). The alignment device 37 includes an insertion piece 37a having a trapezoidal cross-section. The insertion piece 37a has a predetermined length that can be inserted in each slot 16 (for example, the length that is the same as the axial length of the slot 16). One side of the insertion piece 37a serves as a flat alignment restrictor 37b that extends straight in the lateral direction that intersects the longitudinal direction of the insertion piece 37a.

Therefore, when the insertion piece 37a of the alignment device 37 is inserted in each slot 16 such that the surface that serves as the alignment restrictor 37b faces the coil sides 22 from the section of the slot 16 close to the opening 17, the alignment restrictor 37b abuts against the coil sides 22 that are not aligned. At this time, the alignment restrictor 37b presses the coil sides 22 in the depth direction of the slot 16 that is perpendicular to the lamination direction of the coil sides 22. Therefore, when the coil sides 22 are pressed by the alignment restrictor 37b of the alignment device 37, the coil sides 22 are arranged close together at the innermost section of the slot 16 and aligned into the original single row laminated state.

After the coil sides 22 of the first row coil piece 20A are inserted in each slot 16 and arranged close together at the innermost section of the slot 16 in the single row laminated state, the coil sides 22 of the second and third row coil pieces 20B, 20C are successively inserted in the same slot 16 in the same procedure as the first row of coil piece 20A. That is, the coil sides 22 of the second and subsequent rows of coil pieces 20B, 20C are arranged in front of the coil pieces (for example, the first row coil piece 20A) that have been inserted in the slot 16 earlier such that the single row laminated states of the coil pieces are parallel to one another. As for the alignment device 37, the cross-sectional shape of the insertion piece 37a (particularly the length along the depth direction of the slot) used for the alignment of the coil sides 22 of the second and subsequent rows of coil pieces 20B, 20C is smaller than that of the insertion piece 37a used for the alignment of the coil sides 22 of the first row coil piece 20A.

Figure 7F:
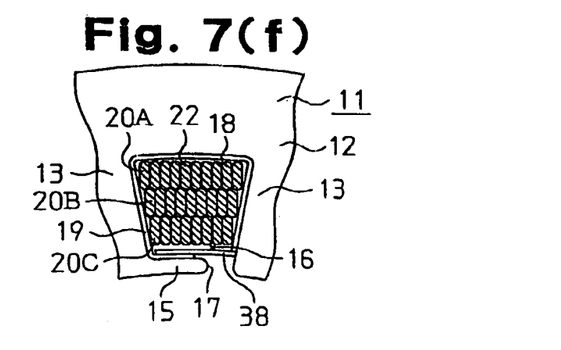

In the preferred embodiment, after the coil sides 22 of the first to third row coil pieces 20A to 20C are inserted (mounted) in the same slot 16, a wedge 38 is inserted in the slot 16 to close the opening 17 as shown in FIG. 7(f). Thus, the single row laminated state of the coil sides 22 of the coil pieces 20A to 20C are formed in three rows (several rows) along the depth direction of the slot 16. Therefore, the lamination factor of the rectangular wire 18 (coil sides 22) in each slot 16 is increased. The number of turns of the rectangular wire 18 when wound into the single row laminated state differs between the first row coil piece 20A and the second row coil piece 20B and between the second row coil piece 20B and the third row coil piece 20C by one turn. Therefore, the coil sides 22 are arranged in a dense staggered pattern in each slot 16 as shown in FIG. 7(f), which further increases the lamination factor of tho rectangular wire 18 (coil sides 22) in the slot 16.

When the above described coil mounting operation is completed, the coil pieces 20 (20A, 20B, 20C) are mounted on the core body 12 of the stator core 11 such that six bundles of the coil sides 22 of each of the coil pieces 20 (20A, 20B, 20C) are mounted in every third slot 16 in the circumferential direction of the core body 12 as shown in FIG. 1. That is, the coil pieces 20 (20A, 20B, 20C) are mounted in the slots 16 through distributed winding. The coil mounting operation is completed by spreading the laminated bundles of the coil ends 23 of the coil pieces 20 (20A, 20B, 20C) exposed from the end of the core body 12.

The first embodiment has the following advantages.

(1) The coil piece 20 is formed of a lamination of the rectangular wire 18 such that the coil sides (slot inserted sections) 22, which will be inserted in the slots 16, and the coil ends 23, which will not be inserted in the slots 16 alternately appear along the coil. The wires are laminated into the "single row laminated state" where the wires are completely overlapped. Each bundle of coil sides 22 is inserted in the corresponding slot 16 after the lamination state is changed from the single row laminated state to the "connectively laminated state" where the wires are partially overlapped. The connectively laminated state is appropriate for the bundle of coil sides 22 to pass through the opening 17 of the slot 16. The laminated state of the coil sides 22 is returned to the original single row laminated state from the connectively laminated state in the slot 16. The coil sides 22 can be mounted in the slot 16 without blocking the opening 17.

Therefore, since a subsequent process such as welding is unnecessary after inserting the coil sides 22 in each slot 16, production efficiency is improved. In addition, when the coil sides 22 are mounted in each slot 16, the coil sides 22 do not block the opening 17. Therefore, the coil sides 22 that are already mounted in the slot 16 do not restrict other coil sides 22 from being subsequently inserted in the slot 16. Thus, the lamination factor of the rectangular wire 18 (coil sides 22) in the slot 16 is maintained in a suitable state. As a result, the output characteristics of the motor (rotary electric machine) are improved.

(2) The coil sides 22 in the single row laminated state are displaced from one another before being inserted in each slot 16 and brought into the connectively laminated state in which the adjacent coil sides 22 partially contact each other. The coil sides 22 brought into the connectively laminated state are held from both sides, which is a direction that intersects with, or is perpendicular to, the length of the overlapped portion of the coil sides 22. More specifically, the coil sides 22 are inclined with respect to the connecting direction so that the coil sides 22 can pass through the opening 17 of the corresponding slot 16. Therefore, the coil sides 22 are brought into the connectively laminated state that is appropriate for inserting the coil sides 22 in the slot 16. The rectangular wires 18 at the coil side 22 are thus smoothly passed through the opening 17 and are promptly and easily mounted in the slots 16.

(3) When each bundle of the coil sides 22 is brought into the connectively laminated state in which the adjacent coil side wires partially contact each other, from the single row laminated state, each bundle of the coil end wires is brought into the connectively laminated state in which the adjacent coil ends 23 intersect and partially contact each other. Therefore, when the coil sides 22 are inserted in each slot 16, the coil sides 22 are reliably prevented from being separated by holding the twisted portion of the corresponding bundle of the coil ends 23. Accordingly, the coil sides 22 are smoothly inserted in the slot 16.

(4) The coil side holding device 30 includes the guide passages 32 having the passage openings 31 the size of which corresponds to the openings 17 of the slots 16. Using the coil side holding device 30, the bundles of the coil sides 22 that are in the connectively laminated state are temporarily accommodated in the guide passages 32. After aligning the passage openings 31 to the openings 17 of the slots 16, the coil sides 22 are extruded from the guide passages 32. Therefore, when inserting each bundle of the coil sides 22 in the corresponding slot 16, the coil sides 22 are held from both left and right sides in a direction that intersects with, or is perpendicular to, the connecting direction by the inner side surfaces 32a of the corresponding guide passage 32. Thus, the connectively laminated state is reliably maintained. Accordingly, each bundle of the coil sides 22 is smoothly inserted in the corresponding slot 16 while the insertion direction is guided by the associated guide passage 32.

(5) Since the core body 12 of the stator core 11 is cylindrical and has slots 16 on the inner circumferential surface of the core body 12, the coil side holding device 30 (first connectively laminated state holding device) has the cylindrical main body 30a, which can be fitted in the core body 12. The bundles of the coil sides 22 in the connectively laminated state are accommodated in the guide passages 32, which are formed in the outer circumferential surface (the section corresponding to the inner circumferential surface of the core body 12) of the main body 30a. The main body 30a is subsequently fitted in the core body 12 and the passage openings 31 are aligned with the openings 17. Therefore, the passage openings 31 of the guide passages 32 are easily aligned with the openings 17 when inserting the bundles of the coil sides 22 that are temporarily accommodated in the guide passages 32 to the slots 16.

(6) Each bundle of the coil sides 22 inserted in the corresponding slot 16 in the connectively laminated state abuts against the guide portion 35a of the guide device 35. The bundle of the coil sides 22 move inward of the corresponding slot 16 along the guide device 35 (guide portion 35a) that is shifted. The bundle of the coil sides 22 are brought into the original single row laminated state from the connectively laminated state. Therefore, each bundle of the coil sides 22 inserted in the corresponding slot 16 is smoothly guided to the innermost section of the slot 16. In addition, the lamination direction of the coil sides 22 in the single row laminated state is easily aligned with the circumferential direction of the stator core 11.

(7) Furthermore, if the coil sides 22 in the single row laminated state are not in line at the innermost section of each slot 16, the insertion piece 37a of the alignment device 37 is inserted in the slot 16. The coil sides 22 are pressed to be in line by the alignment restrictor 37b formed by one side of the insertion piece 37a. Therefore, the coil sides 22 are easily brought into the aligned single row laminated state by the alignment function of the alignment restrictor 37b of the alignment device 37.

(8) In addition, as for the coil piece 20 that is in the single row laminated state in which the coil sides 22 and the coil ends 23 are alternately arranged, three coil pieces 20, which includes the first row coil piece 20A, the second row coil piece 20B, and the third row coil piece 20C, are formed in advance and connected with on another with the connecting wire 24. One of the laminated bundles of coil sides 22 of each coil piece 20A to 20C is mounted in the same slot 16 to form a three-row structure of the single row laminated state with the bundles of coil sides 22 in the depth direction of the slot 16. Therefore, the lamination factor of the coil sides 22 (rectangular wire 18) in each slot 16 is significantly improved.

(9) Furthermore, the number of turns of the rectangular wire 18, which defines the number of laminations of the coil sides 22, differs by one turn among the laminated bundles of the rows of the coil pieces 20A to 20C forming the three-row structure of the single row laminated state. Therefore, the bundles of the coil sides 22 are arranged in a dense staggered pattern in the slot 16. Thus, the lamination factor of the coil sides 22 (rectangular wire 18) in each slot 16 is further improved.

(10) The number of coils and the arrangement of the coils in each slot 16 are variable by adjusting the number of laminations of the rectangular wire 18, which forms the bundles of the coil sides 22 (coil ends 23) in the coil piece 20 (20A, 20B, 20C). This adds to the flexibility of the design of the coil mounted in the slots 16. Therefore, a mounting manner of the coil that is effective in optimizing the operating condition of the motor 10 is achieved.

(11) Particularly in the coil piece 20 (20A, 20B, 20C), three or more laminated bundles (six bundles in this embodiment) of coil sides 22 in the single row laminated state are provided in the winding direction of the rectangular wire 18. The laminated bundles of coil sides 22 are mounted in the slots 16 that sandwich several slots 16 in between. In this embodiment, the laminated bundles of coil sides 22 are mounted in every third slot 16. Therefore, a coil mounting manner is achieved that is effective when mounting the coil through distributed winding, which is different from the concentrated winding.

The preferred embodiment may be changed as according to the following further preferred embodiments (modified embodiments).

Figure 9:
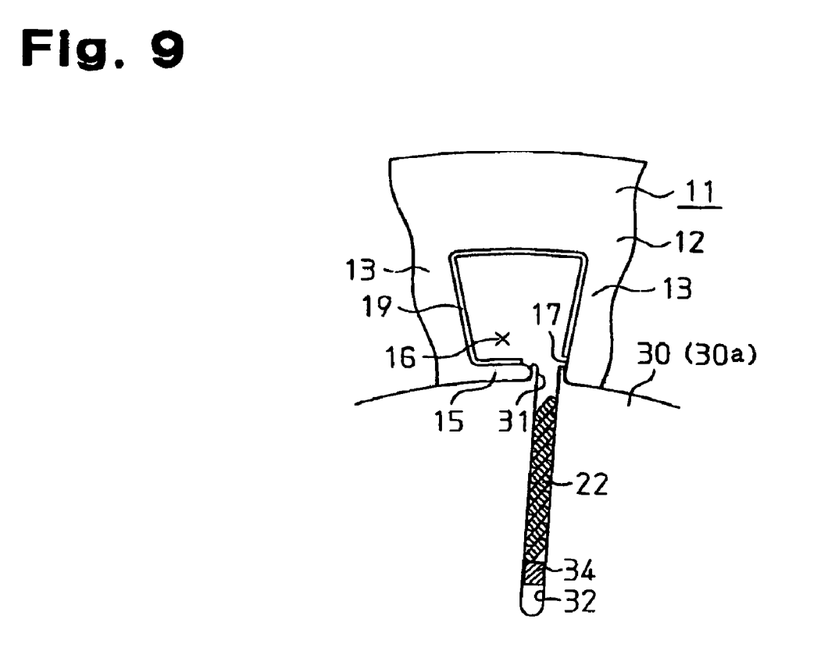
FIG. 9 is a partial plan view illustrating a modified coil side holding device in which the passage opening is shaped as an insertion opening.

As shown in FIG. 9, the passage openings 31 of the guide passages 32, which are formed in the main body 30a of the coil side holding device 30, may be formed such that the passage openings 31 can be inserted in the openings 17 of the slots 16. In this case, when each bundle of the coil sides 22 is extruded from the associated guide passage 32 and inserted in the corresponding slot 16, the coil sides 22 are prevented from abutting against the rim of the opening 17. Thus, each bundle of the coil sides 22 is smoothly and reliably inserted (mounted) in-the corresponding slot 16.

Figure 10:
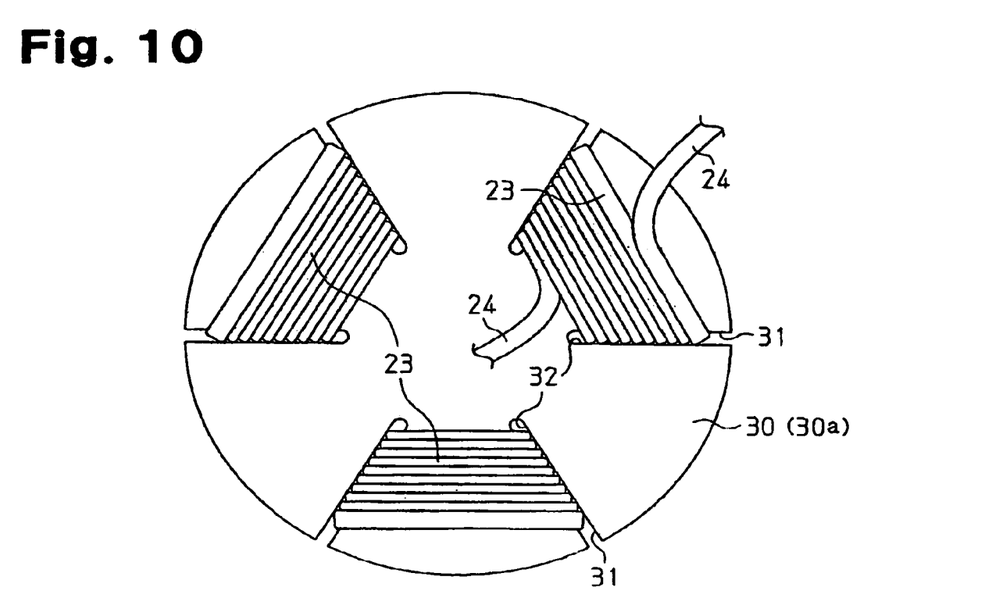
FIG. 10 is a partial plan view illustrating the connectively laminated state of a modified coil ends.

As shown in FIG. 10, when the bundles of the coil sides 22 are brought into the connectively laminated state and temporarily accommodated in the guide passages 32 of the coil side holding device 30, the bundles of the coil ends 23 that have been in the single row laminated state may be brought into the connectively laminated state in which the adjacent coil end wires in the lamination direction partially overlap in a substantially parallel manner. In this case, the displacement directions along which the bundles of coil sides 22 that are adjacent Lo each other via the coil end 23 return to the original single row laminated state from the connectively laminated state when being inserted in the slots 16 are the same. Therefore, the bundles of the coil sides 22 are smoothly restored to the original single row laminated state.

Figure 11:
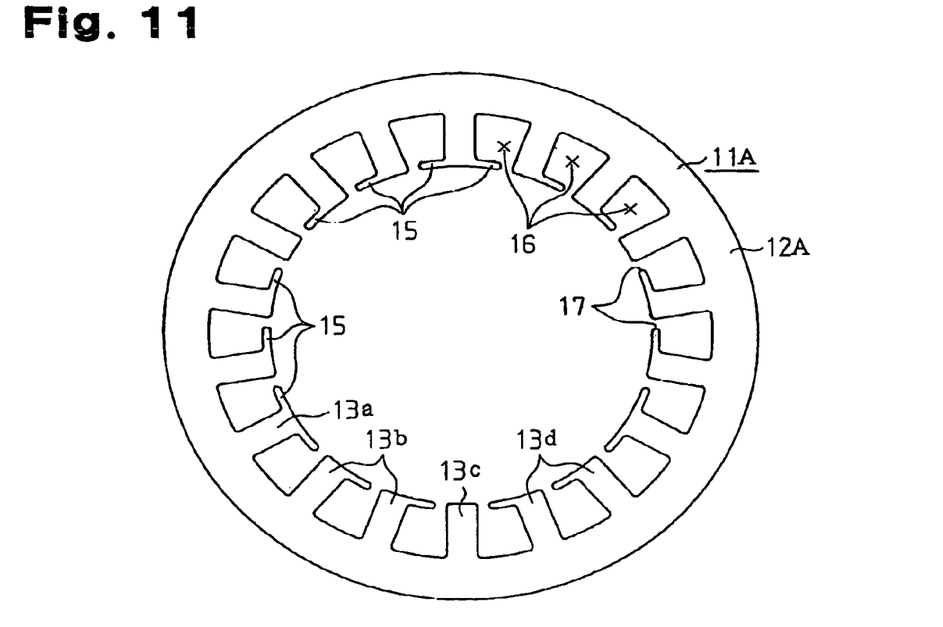
FIG. 11 is a front view illustrating a modified stator core.

In a case where the bundles of the coil end 23 wires are brought into the connectively laminated state in which the coil end 23 wires are substantially parallel to one another as shown in FIG. 10, the stator core 11 (core body 12) to which the coil side holding device 30 (main body 30a) is inserted should preferably be a stator core 11A (core body 12A) having the teeth 13-with four types of distal ends. That is, the teeth 13 include T-shaped teeth 13a, L-shaped teeth 13b, I-shaped teeth 13c, and reverse L-shaped teeth 13d. Each T-shaped tooth 13a has, at its distal end, projections 15, which extend in both circumferential directions of the stator core 11A. The L-shaped teeth 13b are the same as those in the preferred embodiment. The I-shaped teeth 13c do not have any projection 15 at the distal ends. Each reverse L-shaped tooth 13d has the projection 15 extending in a direction opposite to that of the preferred embodiment. The teeth 13a, 13b, 13c, and 13d are preferably arranged as shown in FIG. 11. With this structure, when inserting the bundles of the coil side 22 wires in the slots 16, the movement of the bundles of coil side 22 wires that are adjacent to the bundle of coil end 23 wires disposed between the coil side wires is symmetrical with respect to a reference line extending along the radial direction of the stator core 11A, after being inserted in the slots 16.

Figure 12:
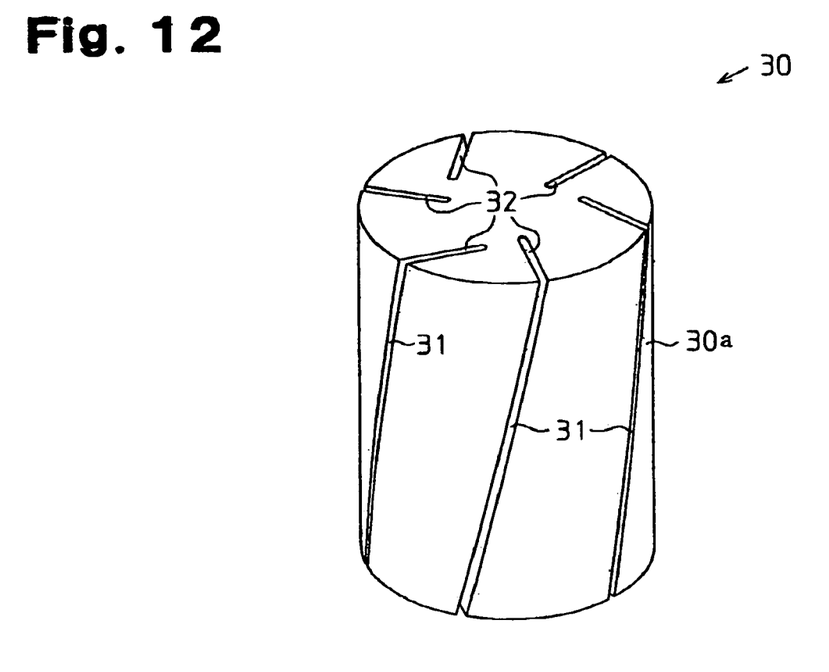
FIG. 12 is a perspective view illustrating a modified coil side holding device applied to a skew core.

In a case where the stator core 11 (core body 12) is a core (skew core) in which the slots 16 are not parallel to the axial direction but are twisted diagonally, the guide passages 32, which are formed in the outer circumferential surface of the main body 30a of the coil side holding device 30, are preferably twisted corresponding to the skew state of the slots 16 as shown in FIG. 12.

Figure 13:
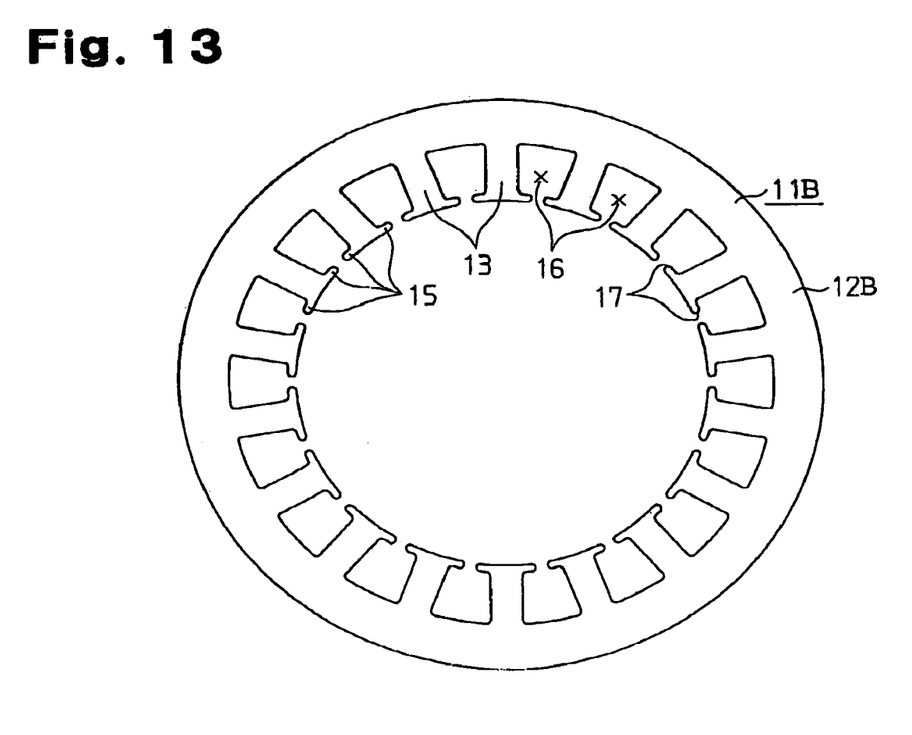
FIG. 13 is a front view illustrating another modified stator core.

The stator core 11 (core body 12) may be a stator core 11B (core body 12B) in which all the teeth 13 are T-shaped and the projections 15 extend in both circumferential directions from the distal end of each tooth 13 as shown in FIG. 13. Alternatively, all the teeth 13 may be reverse L-shaped in which the projections 15 extend in a direction opposite to that of the preferred embodiment.

Figure 14:
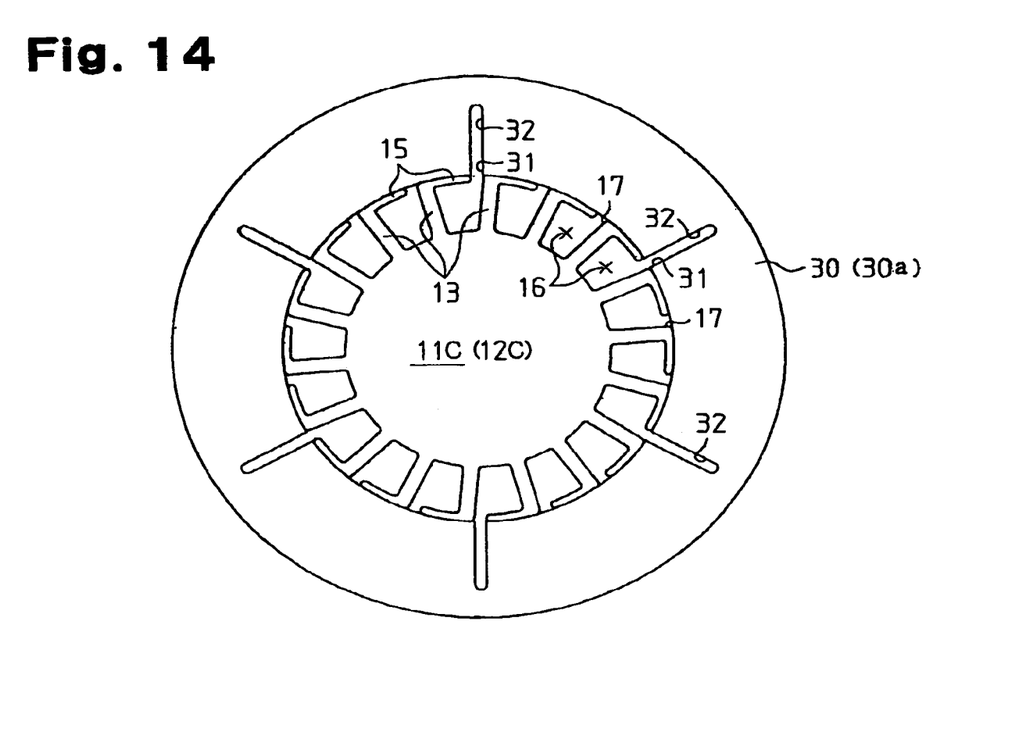
FIG. 14 is a front view illustrating a state where a stator core applied to an outer rotor type motor is being mounted on a coil side holding device.

When the motor is an outer rotor type, the coil side holding device (second connectively laminated state holding device) 30 as shown in FIG. 14 is preferably used. The coil side holding device (second connectively laminated state holding device) 30 has the cylindrical main body 30a, which is fitted to the outer circumferential surface of the columnar stator core 11C (core body 12C) in which the slots 16 are formed. In this case, the passage openings 31 of the guide passages 32 are formed in the inner circumferential surface (the section corresponding to the outer circumferential surface of the core body 12C) of the main body 30a.

In the above embodiment, the number of the coil pieces 20, which are connected to one another with the connecting wire 24 in advance, need not be three, but may be two or more than three. Furthermore, only one coil piece 20 may be provided. The coil pieces (20A, 20B, 20C) may be connected to one another with the connecting wire 24 after the bundles of coil sides 22 are mounted in the slots 16. In this case also, only one connecting wire 24 is used to connect the coil pieces 20 in the subsequent process. Since it is not required to connect all coils (rectangular wires 18) in the subsequent process, the production efficiency is not decreased.

In the above embodiment, the holding members 33, 36, the extruding members 34, the guide devices 35, and the alignment devices 37 need not be used and their shapes may be changed as required. Furthermore, the holding members 33, 36, the extruding members 34, the guide devices 35, and the alignment devices 37 may be operated manually or mechanically. When forming the coil piece 20, the coil piece forming device need not be the one described in the preferred embodiment shown in FIG. 3.

In the preferred embodiment, a core for a rotary electric machine is the stator core 11. However, as is applicable from the modified embodiment shown in FIG. 14, a core for a rotary electric machine may be a rotor core. The rotary electric machine need not be a motor but may be a generator. The invention may be applied to a stator core (or a rotor core) of the generator.

In the above embodiment, tile slots 16 are formed in the inner circumferential surface (or the outer circumferential surface) of the core body 12 at an equal pitch but may be arranged at an irregular pitch.

In the above embodiment, the width of the wide surface of the rectangular wire 18 may be smaller than the width of the opening 17 of each slot 16.

When the bundles of the coil sides 22 are temporarily inserted in the guide passages 32 of the coil side holding device 30, each bundle of the coil sides 22 need not be in the connectively laminated state in which the coil sides 22 are parallel to each other in the diagonal state as long as the coil sides 22 are in the connectively laminated state in which the adjacent coil sides 22 partially contact each other.

In the above embodiment, the coil side holding device 30 (main body 30A) need not be columnar as shown in FIGS. 4, 12 as long as the passage openings 31 of the guide passages 32 are formed at the section corresponding to the inner circumferential surface of the core body 12.

The rectangular wire 18 may be anything as long as it has a flat cross-section such as a trapezoidal cross-section or an oval cross-section so that a surface that serves as the laminated surface is provided when the rectangular wire is brought into the single row laminated state.

Therefore, the present examples and embodiments are to be considered as illustrative and not restrictive and the invention is not to be limited to the details given herein, but may be modified within the scope and equivalence of the appended claims.

The invention claimed is:

1. A method for mounting a coil piece onto a core of a rotary electric machine, the core having a plurality of slots each having an opening, the method comprising:
   repeatedly winding wire having a flat-cross-section so that the wire forms a plurality of wire layers that are laminated in a single row, thereby forming the coil piece in which the wire layers are in a first laminated state, the first laminated state referring to a state in which the plurality of wire layers are aligned along a line that is perpendicular to flat surfaces of the wire, wherein the coil piece has first portions each inserted into one of the slots and second portions that are not inserted into the slots, the first portions and the second portions are arranged alternately along a direction in which the wire extends;
   shifting the state of the first portions from the first laminated state to a second laminated state by displacing the wire layers in each first portion relative to each other along the flat surfaces of the wire, the second laminated state referring to a state in which each adjacent pair of the wire layers partially overlap with respect to a direction perpendicular to the flat surfaces of the wire;
   inserting the first portions in the second laminated state into the slots by causing each first portion to pass through the opening of the corresponding slot in an order from the head of the laminated wire layers; and
   returning the first portions in the slots from the second laminated state to the first laminated state by displacing the wire layers in each first portion relative to each other.

2. The method according to claim 1, further comprising maintaining the wire layers in the first portions in a state aligned along a line that is inclined relative to the flat surfaces of the wire by holding each first portion in the second laminated state from both sides.

3. The method according to claim 1, further comprising, when shifting the state of the first portions from the first laminated state to the second laminated state, displacing the wire layers in each second portion relative to each other along the flat surfaces of the wire, thereby shifting the state of the second portions from the first laminated state to a state in which each adjacent pair of the wire layers intersect each other and partially overlap with respect to a direction perpendicular to the flat surfaces of the wire.

4. The method according to claim 1, further comprising, when shifting the state of the first portions from the first laminated state to the second laminated state, displacing the wire layers in each second portion relative to each other along the flat surfaces of the wire, thereby shifting the state of the second portions from the first laminated state to a state in which each adjacent pair of the wire layers are parallel to each other and partially overlap with respect to a direction perpendicular to the flat surfaces of the wire.

5. The method according to claim 1, further comprising:
   preparing a holding device having a plurality of guide passages, each guide passages having an opening;
   accommodating the first portions in the second laminated states in the guide passages of the holding device, wherein each first portion is held by inner side surfaces of the corresponding guide passage such that the first portions are maintained in the second laminated state;
   arranging the holding device relative to the core, such that the guide passage openings face the slot openings; and
   inserting each first portion into the corresponding slot through the corresponding guide passage opening and the corresponding slot opening, by extruding the first portion from the guide passage.

6. The method according to claim 5, wherein the slots are formed at equal intervals along a circumferential direction on an inner or outer circumferential surface of the core, wherein, when the slots are formed on the inner circumferential surface of the core, a first holding device is used as the holding device, the first holding device having the guide passage openings at positions corresponding to the inner circumferential surface of the core, and wherein, when the slots are formed on the outer circumferential surface of the coke, a second holding device is used as the holding device, the second holding device having the guide passage openings at positions corresponding to the outer circumferential surface of the core.

7. The method according to claim 5, wherein the holding device has insertion portions each of which defines one of the guide passage openings and is adapted to be inserted into one of the slot openings.

8. The method according to claim 1, further comprising using an alignment device including an insertion piece, wherein the insertion piece has a length adapted to be inserted into one of the slots and has an alignment restrictor, wherein the wire layers in the first portion in each of the slots are aligned into the first laminated state by inserting the insertion piece into the slot and pressing the first portion with the alignment restrictor.

9. The method according to claim 1, wherein the coil piece is a first coil piece, the method further comprising, after inserting each first portion of the first coil piece into the corresponding slot such that the first laminated state is achieved, inserting first portions of the second coil piece, which is connected to the first coil piece with a connecting wire, into the slots, in each of which one of the first portions of the first coil piece has been inserted, thereby achieving the first laminated state.

* * * * *

UNITED STATES PATENT AND TRADEMARK OFFICE
CERTIFICATE OF CORRECTION

PATENT NO. : 7,246,428 B2
APPLICATION NO. : 11/096106
DATED : July 24, 2007
INVENTOR(S) : Hiroshi Fukasaku et al.

It is certified that error appears in the above-identified patent and that said Letters Patent is hereby corrected as shown below:

On the Title page, Item (57) in the Abstract,

Line 3, please delete "flat cross section" and insert therefore
--flat cross-section--;

Line 11, please delete "laminated stat e" and insert therefore
--laminated state--;

Line 12, please delete "in the slot each adjacent" and insert therefore --in the slot, each adjacent--;

Column 1, lines 31 and 39, please delete "rectangular cross section" and insert therefore --rectangular cross-section--;

Column 1, line 63, please delete "each slot in harrowed" and insert therefore --each slot is narrowed--;

Column 3, line 66, please delete "will how be described" and insert therefore --will now be described--;

Column 5, line 15, please delete "secured Lo" and insert therefore --secured to--;

Column 8, line 5, please delete "inserted in the each slot" and insert therefore --inserted in each slot--;

Column 9, lines 28-29, please delete "dense staggered pattern" and insert therefore --dense, staggered pattern--;

Column 9, line 30, please delete "factor of tho rectangular wire 18" and insert therefore --factor of the rectangular wire 18--;

Column 9, line 41, please delete "coil ends. 23" and insert therefore --coil ends 23--;

Column 10, line 18, please delete "coil side 22" and insert therefore --coil sides 22--;

Column 11, line 26, please delete "with on another" and insert therefore --with one another--;

UNITED STATES PATENT AND TRADEMARK OFFICE
CERTIFICATE OF CORRECTION

PATENT NO. : 7,246,428 B2
APPLICATION NO. : 11/096106
DATED : July 24, 2007
INVENTOR(S) : Hiroshi Fukasaku et al.

It is certified that error appears in the above-identified patent and that said Letters Patent is hereby corrected as shown below:

Column 11, lines 39-40, please delete "dense staggered pattern" and insert therefore --dense, staggered pattern--;

Column 12, line 17, please delete "adjacent Lo" and insert therefore --adjacent to--;

Column 12, line 17, please delete "coil end 23" and insert therefore --coil ends 23--;

Column 12, line 29, please delete "teeth 13-with four types" and insert therefore --teeth 13 with four types--; and Column 13, line 33, please delete "tile slots 16" and insert therefore --the slots 16--.

In Claim 6, column 15, lines 5-6, please delete "surface of the coke," and insert therefore --surface of the core,--.

Signed and Sealed this

Twenty-fifth Day of August, 2009

David J. Kappos
*Director of the United States Patent and Trademark Office*